United States Patent [19]

Matsumoto et al.

[11] Patent Number: 5,506,181
[45] Date of Patent: Apr. 9, 1996

[54] REFRACTORY FOR USE IN CASTING OPERATIONS

[75] Inventors: Osami Matsumoto; Toshihiro Isobe; Syouichi Itose, all of Hyogo, Japan

[73] Assignee: Harima Ceramic Co., Ltd., Takasago, Japan

[21] Appl. No.: 269,096

[22] Filed: Jun. 30, 1994

[51] Int. Cl.$^6$ .................................................. C04B 35/10
[52] U.S. Cl. .......................... 501/120; 501/121; 501/122; 501/128; 106/692
[58] Field of Search ................................ 501/120, 121, 501/122, 127, 128, 153, 154; 106/692

[56] References Cited

U.S. PATENT DOCUMENTS 5,283,215  2/1994  Hosokawa et al. .................... 501/120

OTHER PUBLICATIONS

Japanese Patent Abstract—"Monolithic Refractory for Ladle", JP 05–185202, Koyago et al. (Jul. 27, 1993).
Japanese Patent Abstract—"Monolithic Refractory For Casting", JP 03–23275, Kawaso et al. (Jan. 31, 1991).

*Primary Examiner*—Paul Marcantoni
*Attorney, Agent, or Firm*—Kanesaka & Takeuchi

[57] ABSTRACT

A refractory of the invention is used in casting operation, which has good spalling resistance and corrosion resistance. The refractory includes: 0.0357–2.6548 wt % of amorphous silica particles having a specific surface area within a range of 15–30 m$^2$/g; 8.8495–28.5612 wt % of alumina particles having a particle diameter within a range of 10–50 mm; 1.3986–18.1715 wt % of at least one of fused magnesia and sintered magnesia, which contains 0.6993–10.9041 wt % of magnesia having a maximum particle diameter under 44 μm; 0.6993–13.630 wt % of alumina cement; and 45.4545–88.1417 wt % of alumina. When the refractory is used, at lease one of fused magnesia and sintered magnesia surrounds the alumina particles, which react together to generate spinel to thereby form micro-crack layer around the alumina particles for preventing propagation of cracks in a refractory structure.

4 Claims, 1 Drawing Sheet

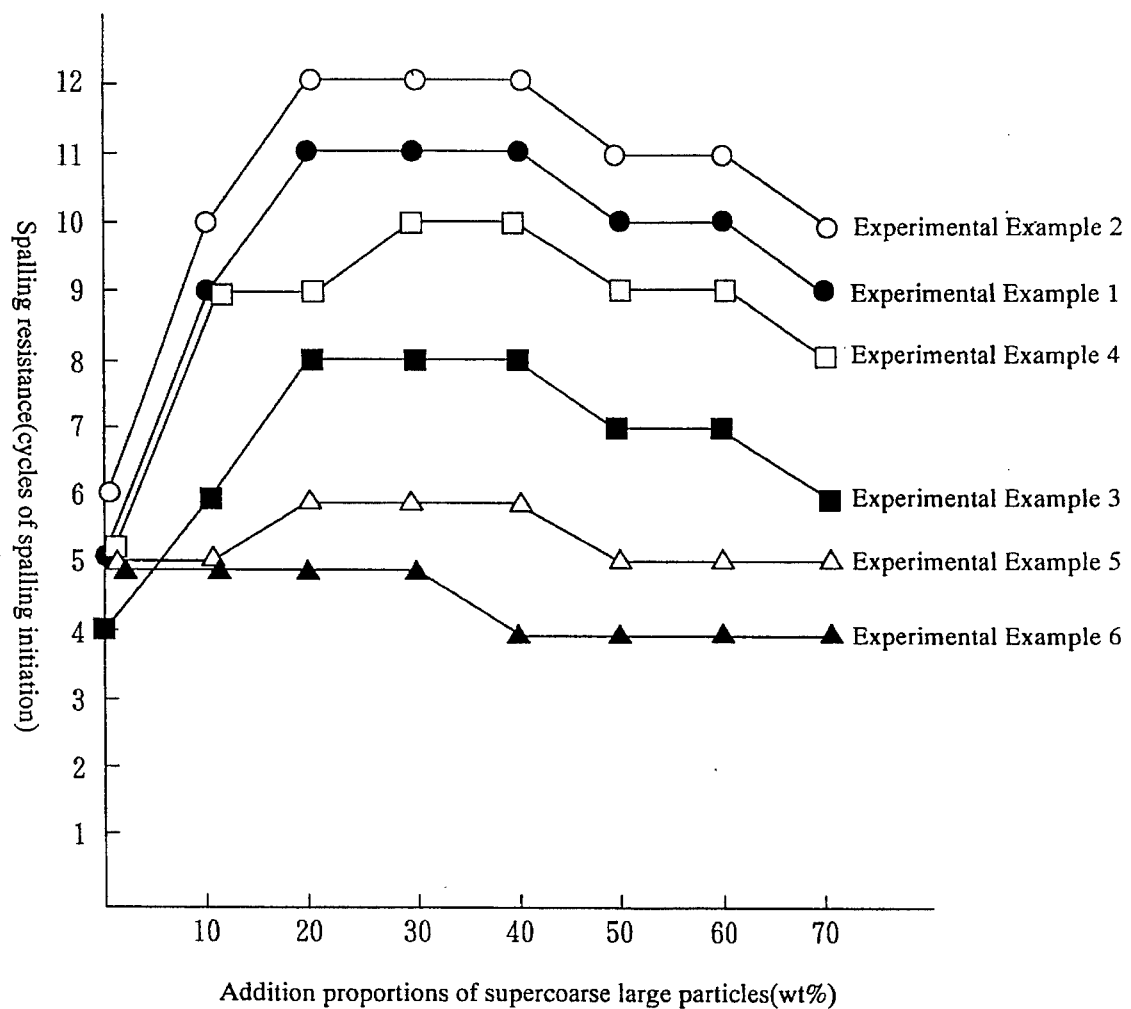

REFRACTORY FOR USE IN CASTING OPERATIONS

BACKGROUND OF THE INVENTION

1. Field of the Invention

The present invention relates to a refractory for use in casting operations which has superior spalling resistance and corrosion resistance when used as a lining in vessels for molten iron and steel production.

2. Background Art

Materials such as the alumina-spinel material disclosed in Japanese Patent Application, First Publication, Laid-Open No. Sho 64-87577, the alumina-magnesia material disclosed in Japanese Patent Application, First Publication, Laid-Open No. Hei 5-97526, and the alumina-spinel-magnesia material disclosed in Japanese Patent Application, First Publication, Laid-Open No. Hei 3-23275, have been proposed as refractories for use in casting operations (hereinbelow referred to as "casting materials") which are used in the lining of molten steel ladles, vacuum de-gassing vessel, tundish, and the like.

These materials possess superior longevity as a result of the synergistic effects of the volume stability of the alumina and the resistance to corrosion of the magnesia or the spinel.

Recently, the conditions of use of vessels for molten steel have become extremely severe as a result of increase in molten steel temperature, extending of holding time, gas-blowing agitation, and the like. As a result, the conventional materials described above do not possess sufficient durablity and higher quality materials have been strongly sought.

SUMMARY OF THE INVENTION

The present invention has as an object thereof to provide a casting material which has spalling resistance and corrosion resistance superior to those of conventional materials.

The present invention comprises a refractory for use in casting operations, wherein 0.05–3 weight parts of amorphous silica superfines, and 10–40 weight parts of super-coarse large alumina particles, having a particle diameter within a range of 10–50 mm, are mixed with 100 weight parts of a mixture containing:

1–12 weight percent of magnesia having a maximum particle diameter of 44 μm or less, a total amount of magnesia being within a range of 2–20 weight percent, and 1–15 weight percent of alumina cement, a remainder comprising primarily alumina.

Namely, a refractory for use in casting operation comprises: 0.0357–2.6548 wt % of amorphous silica particles having a specific surface area within a range of 15–30 $m^2/g$;

8.8495–28.5612 wt % of first alumina particles having a particle diameter within a range of 10–50 mm;

1.3986–18.1715 wt % of at least one of fused magnesia and sintered magnesia, said at least one of fused magnesia and sintered magnesia containing 0.6993–10.9041 wt % of magnesia having a maximum particle diameter under 44 μm;

0.6993–13.630 wt % of alumina cement; and 45.4545–88.1417 wt % of second alumina particles having a particle diameter less than 10 mm.

Furthermore, a further embodiment of the invention comprises a refractory for use in casting operations, wherein 0.05–3 weight parts of amorphous silica superfines, and 10–40 weight parts of super-coarse large alumina particles, having a particle diameter within a range of 10–50 mm, are mixed with 100 weight parts of a mixture containing:

1–10 weight percent of magnesia having a maximum particle diameter of 15 μm or less, a total amount of magnesia being within a range of 2–20 weight percent, and 1–15 weight percent of alumina cement, a remainder comprising primarily alumina.

Namely, refractory for use in casting operation comprises:

0.0357–2.6548 wt % of amorphous silica particles having a specific surface area within a range of 15–30 $m^2/g$;

8.8495–28.5612 wt % of first alumina particles having a particle diameter within a range of 10–50 mm;

1.3986–18.1715 wt % of at least one of fused magnesia and sintered magnesia, said at least one of fused magnesia and sintered magnesia containing 0.6993–9.0867 wt % of magnesia having a maximum particle diameter under 15 μm;

0.6993–13.630 wt % of alumina cement; and 45.4545–88.1417 wt % of second alumina particles having a particle diameter less than 10 mm.

BRIEF DESCRIPTION OF THE DRAWINGS

FIG. 1 is a graph showing the relationship between spalling resistance and the proportion of super-coarse large particles added.

DETAILED DESCRIPTION OF THE INVENTION

In the mixing composition of the present invention, magnesia possesses the effect of resistance to slag erosion. Furthermore, this reacts with alumina during use at high temperatures, and forms a $MgO \cdot Al_2O_3$ spinel. This spinel forms a solid solution with components such as FeO and MnO within the slag, and thus acts to prevent slag penetration into the refractory structure.

In the present invention, a portion or all of the magnesia used was magnesia having a maximum particle diameter of 44 μm or less (hereinbelow, abbreviated to "magnesia superfines"), and this is used in combination with super-coarse large alumina particles.

The addition of super-coarse large alumina particles to casting material is commonly known. However, in the present invention, super-coarse large alumina particles and magnesia superfines are combined at pre-specified ratio in an alumina-magnesia casting material, and thereby, it is possible to greatly improve the spalling resistance and the corrosion resistance.

Table 1 shows the mixtures of the casting materials employed in the experimental examples.

TABLE 1

| Mixture composition (wt %) | Experimental Example 1 | Experimental Example 2 | Experimental Example 3 | Experimental Example 4 | Experimental Example 5 | Experimental Example 6 |
| --- | --- | --- | --- | --- | --- | --- |
| Fused alumina 5–1 mm | 60 wt% | 60 wt % | 60 wt % | 60 wt % | 60 wt % | 60 wt % |
| Fused alumina 0.5–1 mm | 17 wt % | 17 wt % | 17 wt % | 17 wt % | 17 wt % | 17 wt % |

TABLE 1-continued

| Mixture composition (wt %) | Experimental Example 1 | Experimental Example 2 | Experimental Example 3 | Experimental Example 4 | Experimental Example 5 | Experimental Example 6 |
|---|---|---|---|---|---|---|
| Sintered alumina 1 μm or less | 5 wt % | 5 wt % | 5 wt % | 5 wt % | 5 wt % | 5 wt % |
| Sintered magnesia 0.5–1 mm | 5 wt % | 5 wt % | 12 wt % | 5 wt % | 5 wt % | 5 wt % |
| Sintered magnesia 44 μm or less | 7 wt % | | | 7 wt % | 7 wt % | 7 wt % |
| Sintered magnesia 15 μm or less | | 7 wt % | | | | |
| Alumina cement | 6 wt % | 6 wt % | 6 wt % | 6 wt % | 6 wt % | 6 wt % |
| Amorphous silica superfines | Further addition of 1 wt % | Further addition of 1 wt % | Further addition of 1 wt % | Further addition of 1 wt % | Further addition of 1 wt % | Further addition of 1 wt % |
| Supercoarse large alumina particles 20–30 mm | Further addition of 0–70 wt % | Further addition of 0–70 wt % | Further addition of 0–70 wt % | | | |
| Supercoarse large spinel particles ($MgO:Al_2O_3 = 22:78$) 20–30 mm | | | | Further addition of 0–70 wt % | | |
| Supercoarse large spinel particles ($MgO:Al_2O_3 = 28:72$) 20–30 mm | | | | | Further addition of 0–70 wt % | |
| Supercoarse large spinel particles ($MgO:Al_2O_3 = 52:48$) 20–30 mm | | | | | | Further addition of 0–70 wt % |

In the casting materials having the various mixtures shown in Table 1, the amount of super-coarse large particles which was added were varied, and the relationship between the spalling resistance of the casting material and the proportion of super-coarse large particles added is shown in the graph of FIG. 1. The test of spalling resistance in this case was conducted by means of the method shown in the column of the embodiments described hereinbelow.

It can be seen from the FIGURE that the addition of super-coarse large particles to any of the materials of Experimental Examples 1 to 5 tended to cause the spalling resistance thereof to increase; however, in Experimental Examples 1, 2, and 4, into which magnesia superfines were blended, as a result of the addition of super-coarse large alumina particles or alumina-rich super-coarse large spinel particles which had a higher $Al_2O_3$ ratio than the spinel theoretical composition, the spalling resistance was even further increased.

On the other hand, in cases such as Experimental Example 3, into which magnesia superfines were not blended even though super-coarse large alumina particles were added, or in the case of Experimental Example 5, in which the ratio of $MgO.Al_2O_3$ in the super-coarse large particles was that of a spinel having a theoretical composition, though magnesia superfines were blended thereinto, the increase in spalling resistance was only on a predictable level, and was not in any way surprisingly high.

Furthermore, in Experimental Example 6, in which magnesia-rich super-coarse large spinel particles having a higher MgO ratio than the spinel theoretical composition were added, the magnesia present in the super-coarse large particles induces a hydration reaction, so that the structure of the refractory is degraded, and there is a tendency for the spalling resistance to decline.

It is thought that the effects resulting from the combination of magnesia superfines and super-coarse large alumina particles or alumina-rich super-coarse large spinel particles having a higher $Al_2O_3$ ratio than the spinel theoretical composition happen for the reason given below. That is to say, the magnesia superfines, which are present around the super-coarse large alumina particles in the structure of the casting material, react with the super-coarse large alumina particles under the high temperature due to the use of the casting material, and form spinel. Then, as a result of the volume expansion accompanying the formation of this spinel, a layer containing microfissures, in which very small cracks are present, is formed around the super-coarse large alumina particles.

It is conventionally known that super-coarse large alumina particles possess the function of suppressing the progression of cracks even in conventional casting materials. However, when the super-coarse large particles and the structure around them become strongly unified, the effect of preventing the progress of cracking is insufficient. In contrast, in the present invention, as a result of the presence of a layer containing microfissures around the super-coarse large particles, the effect of preventing the progress of cracking which is possessed by the super-coarse large particles becomes more striking.

The magnesia employed in the present invention may be sintered or fused. Magnesia itself has superior resistance to slag erosion. Furthermore, it produces a $MgO.Al_2O_3$ spinel as a reaction product with alumina, and this spinel creates a solid solution with components such as FeO, MnO, and the like, which are present in the slag, and thus prevents the penetration of the slag into the structure of the refractory.

The mixing proportion of the magnesia in the present invention is within a range of 1–12 weight percent for magnesia having a maximum particle diameter of 44 μm or less, and a total amount of 2–20 weight percent.

When the amount of magnesia superfines having a maximum particle diameter of 44 μm or less is less than 1 weight percent, the spalling resistance is poor, perhaps because the spinel formation around the super-coarse large alumina particles is insufficient. Furthermore, when the proportion thereof exceeds 12 weight percent, excessive amounts of spinel are produced, and the spalling resistance worsens as a result of the volume expansion accompanying such spinel formation.

When the total amount of magnesia present is less than 2 weight percent, the corrosion resistance effect possessed by magnesia is not exhibited. Furthermore, the thermal expansion of magnesia is high, and when the total amount thereof exceeds 20 weight percent, the volume stability is adversely affected.

When the maximum particle diameter of the magnesia superfines is limited to 15 μm or less, the spalling resistance is even further improved, perhaps because the formation of spinel around the super-coarse large alumina particles is further promoted. However, when the amount of spinel produced is too great, the spalling resistance declines, so that the proportion of magnesia superfines having a maximum particle diameter of 15 μm or less is set at 10 weight percent or less.

Alumina is a material which is provided with both corrosion resistance and volume stability, and serves as the primary material in the present invention. Either sintered alumina or fused alumina may be employed, and it is preferable that the $Al_2O_3$ purity be 90 weight percent or greater. Alumina containing $TiO_2$ in an amount within a range of 1–8 weight percent may be employed. Products of low purity such as aluminite, silimanite, mullite, and the like may be employed; however, it is preferable that a high purity product be employed in the fines portion.

The particle diameter of the alumina is set to less than 10 mm in order to distinguish it from the super-coarse large alumina particles described hereinbelow; however, it is preferable that this particle diameter be set to a level of 5 mm or less, and that this range be divided into coarse particles, medium particles, and fine particles. Furthermore, a calcined product may be used as the fines.

Silica flour, which is, for example, obtained as a by-product during the production of silicon or silicon alloys, or fumed silica, which is commercially available under trade names such as "Microsilica" and the like, may be employed as the amorphous silica superfines. These are superfine particles having a specific surface area within a range of 15–30 $m^2/g$.

As the magnesia used in the present invention is in the form of superfines, it easily produces a hydration reaction. When hydrated, cracking resulting from volume expansion is generated. Amorphous silica superfines have the effect of preventing the hydration reaction of the magnesia.

When the proportions of the amorphous silica superfines is less than 0.05 weight parts by further addition, then there is no hydration prevention effect, while when the proportion is in excess of 3 weight parts by further addition, a material with a low melting point is produced, and corrosion resistance declines.

The alumina cement serves as a binder. The proportions and concrete types thereof are essentially unchanged from those of the conventional material. When the amount thereof is less than 1 weight percent, the construction strength is poor, while when the amount exceeds 15 weight percent, the corrosion resistance declines.

When used in combination with the magnesia superfines, the super-coarse large alumina particles possess a spalling resistance effect. When the particle diameter of the super-coarse alumina particles is less than 10 mm, or when the proportion thereof is less than 10 weight parts by further addition, the spalling resistance effect is poor. When the particle diameter thereof exceeds 50 mm, or when the proportion thereof exceeds 40 weight parts by further addition, the strength of the construction declines as a result of the poor balance of the particulate structure, and the resistance to corrosion declines.

The actual material used for the super-coarse large alumina particles may be either fused or sintered. Brick fragments having alumina as a main component thereof may be employed. Furthermore, $MgO.Al_2O_3$ spinels have the characteristic superior to alumina in corrosion resistance, so that in conditions of use in which corrosion resistance is particularly required, it is preferable that super-coarse large $MgO.Al_2O_3$ spinel particles be used as a portion or all of the super-coarse large alumina particles. Such super-coarse large spinel particles may be employed if the $Al_2O_3$ component thereof is 80 weight percent or more, which is in excess of the spinel theoretical composition.

In order to adjust the workability during casting work, the period during which use is possible, and the like, approximately 0.01–0.5 weight percent of a deflocculant, a hardening conditioner, or the like may be added. Concrete examples of the deflocculant included, for example, tripolyphosphate soda, hexametaphosphate soda, ultrapolyphosphate soda, acid hexametaphosphate soda, borate soda, carbonate soda, and other inorganic salts, as well as citrate soda, tartarate soda, polyacrylate soda, sulfonate soda, and the like. Examples of the hardening conditioner include, for example, boric acid, ammonium borate, ultrapolyphosphate soda, lithium carbonate, and the like.

Furthermore, where necessary, and within ranges which do no hinder the effects of the present invention, aluminum powder, aluminum alloy powder, glass powder, carbon powder, pitch powder, zircon, zirconia, metal fibers, organic fibers, ceramic fibers, foaming agents, or the like, may be added.

The casting work is conducted by means of a common method, and approximately 4–8 weight percent of water for casting work is added or blended in the above mixing compositions by further addition, and material is casted using a mold. During the casting work, in order to increase the fillability, a vibrator is commonly attached to the mold, or a rod-shaped vibrator is inserted into the refractory.

The refractory of the present invention is not merely directly applied to vessels for molten steel; it may also be used as a lining material for blocks casted in advance in a freely desired shape. For example, it is preferable that pre-casted block is installed in impact portions of molten steel ladles.

Embodiments

Hereinbelow, embodiments of the present invention and comparative examples will be described.

Table 2 shows the quality of the raw materials used in each example. Tables 3 and 4 show the experimental results of the mixture compositions and the casted pieces of each example.

TABLE 2

Magnesia superfines, Supercoarse large particles, and amorphous silica superfines used in the Embodiments and Comparative Examples

| | | | Chemical composition (wt %) | |
|---|---|---|---|---|
| | Manufacturing method | particle diameter | MgO | $Al_2O_3$ |
| Magnesia superfines A | Sintering | Maximum 44 μm | 96.5 | 0.2 |

TABLE 2-continued

Magnesia superfines, Supercoarse large particles, and amorphous silica superfines used in the Embodiments and Comparative Examples

|  | Manufacturing method | particle diameter | Chemical composition (wt %) | |
|---|---|---|---|---|
|  |  |  | MgO | $Al_2O_3$ |
| Magnesia superfines B | Fusing | Maximum 15 μm | 99.1 | 0.1 |
| Magnesia superfines C | Sintering | Maximum 5 μm | 98.5 | 0.1 |
| Supercoarse large alumina particles A | Firing (spherical product) | 10–20 mm | — | 99.5 |
| Supercoarse large alumina particles B | Fusing (crushed product) | 20–50 mm | — | 99.7 |
| Supercoarse large alumina particles C | Fusing (crushed product) | 60–70 mm | — | 99.7 |
| Supercoarse large alumina particles D | Brick fragments | 20–40 mm | 7.1 | 80.3 |
| Supercoarse large spinel particles A | Sintering (spherical product) | 20–40 mm | 5.0 | 94.6 |
| Supercoarse large spinel particles B | Sintering (spherical product) | 20–40 mm | 24.4 | 75.2 |
| Supercoarse large spinel particles C | Fusing (crushed product) | 20–40 mm | 27.3 | 72.5 |
| Supercoarse large spinel particles D | Sintering (spherical product) | 20–40 mm | 49.8 | 49.5 |
| Supercoarse large magnesia particles | Sintering (spherical product) | 20–40 mm | 95.4 | 0.3 |
| Amorphous silica superfines | Formation from fumed component of silicon | Specific surface area $18\ m^2/g$ | $SiO_2$ | 95.3 |

TABLE 3

Embodiments, Comparative Examples, and Test Results Thereof

| | Embodiments of the Invention | | | | | | | | |
|---|---|---|---|---|---|---|---|---|---|
| | 1 | 2 | 3 | 4 | 5 | 6 | 7 | 8 | 9 |
| Mixture proportions wt % | | | | | | | | | |
| Sintered alumina 5–1 mm | | 50 | | | | 50 | | 50 | |
| Fused alumina 5–1 mm | 50 | | 50 | 50 | 50 | | 50 | | 50 |
| Fused alumina 1 mm or less | 20 | 20 | 20 | 20 | 23 | 20 | 20 | 20 | 20 |
| Sintered alumina 0.075 mm or less | 5 | | | 5 | 5 | 5 | 5 | | 5 |
| Calcined alumina 10 μm or less | 5 | 5 | 5 | | 5 | 5 | | | 5 |
| Sintered magnesia 5–1 mm | | | | | | | 10 | | |
| Sintered magnesia 1–0.045 mm | 9 | 5 | 8 | 5 | 1 | 5 | | 10 | 5 |
| Magnesia superfines A | 1 | 10 | 12 | 5 | | | | 2 | |
| Magnesia superfines B | | | | 5 | 1 | 5 | 10 | 8 | |
| Magnesia superfines C | | | | | | | | | 5 |
| Alumina cement | 10 | 10 | 10 | 10 | 15 | 10 | 5 | 10 | 10 |
| Amorphous silica superfines | (1.0) | (1.5) | (2.0) | (1.5) | (0.1) | (1.5) | (2.0) | (2.0) | (2.5) |
| supercoarse large alumina particles A | (20) | | | | (20) | | | | |
| supercoarse large alumina particles B | | (20) | (20) | (20) | | (20) | | (30) | (10) |
| supercoarse large alumina particles C | | | | | | | | | |
| supercoarse large alumina particles D | | | | | | | (20) | | |
| Supercoarse large spinel particles A | | | | | | | | | (10) |
| Supercoarse large magnesia particles | | | | | | | | | |
| Test | | | | | | | | | |
| Modulus of rupture (kg/cm²) | | | | | | | | | |
| After-drying | 98 | 102 | 100 | 95 | 112 | 92 | 82 | 108 | 106 |
| After-heating | 143 | 152 | 162 | 159 | 132 | 191 | 156 | 170 | 186 |
| Spalling resistance (Lifespan cycles) | 12 | 11 | 11 | 12 | 14 | 13 | 13 | 11 | 12 |
| Slaking resistance | ○ | ○ | ○ | ○ | ○ | ○ | ○ | ○ | ○ |
| Corrosion resistance (mm) | 6.8 | 6.7 | 5.7 | 6.2 | 6.9 | 5.9 | 5.7 | 5.6 | 5.5 |
| Resistance to slag penetration (mm) | 3.5 | 2.4 | 2.7 | 2.6 | 4.2 | 2.8 | 2.5 | 2.7 | 2.6 |
| Acltual use test (mm) | 90 | — | — | 95 | — | 112 | — | 119 | 117 |

| | Comparative Examples | | | | | | | | |
|---|---|---|---|---|---|---|---|---|---|
| | 1 | 2 | 3 | 4 | 5 | 6 | 7 | 8 | 9 |
| Mixture proportions wt % | | | | | | | | | |
| Sintered alumina 5–1 mm | | | | 50 | | | | | |
| Fused alumina 5–1 mm | 50 | 45 | 50 | | 50 | 50 | 50 | 50 | 50 |
| Fused alumina 1 mm or less | 20 | 20 | 20 | 20 | 20 | 20 | 20 | 20 | 20 |
| Sintered alumina 0.075 mm or less | | | 5 | | | | 5 | 5 | 18 |
| Calcined alumina 10 μm or less | | | 5 | 5 | 5 | | | | 5 |
| Sintered magnesia 5–1 mm | | | | | | | | | |
| Sintered magnesia 1–0.045 mm | | 20 | 5 | 10 | 5 | | | 15 | 1 |
| Magnesia superfines A | 20 | | 5 | 10 | | | | | |
| Magnesia superfines B | | 10 | | | 10 | 10 | 10 | | 1 |

TABLE 3-continued

Embodiments, Comparative Examples, and Test Results Thereof

| | 1 | 2 | 3 | 4 | 5 | 6 | 7 | 8 | 9 |
|---|---|---|---|---|---|---|---|---|---|
| Magnesia superfines C | | | | | 5 | 10 | | | |
| Alumina cement | 10 | 5 | 10 | 5 | 10 | 5 | 5 | 10 | 5 |
| Amorphous silica superfines | (2.0) | (2.5) | (1.5) | (2.0) | (2.0) | (2.5) | (5.0) | (1.5) | |
| supercoarse large alumina particles A | | | | | | | | | (20) |
| supercoarse large alumina particles B | (20) | (20) | | | (5) | (50) | (20) | (20) | |
| supercoarse large alumina particles C | | | (20) | | | | | | |
| supercoarse large alumina particles D | | | | | | | | | |
| Supercoarse large spinel particles A | | | | | | | | | |
| Supercoarse large magnesia particles | | | | (20) | | | | | |
| Test | | | | | | | | | |
| Modulus of rupture (kg/cm²) | | | | | | | | | |
| After-drying | 112 | 95 | 52 | 97 | 121 | 61 | 105 | 98 | 76 |
| After-heating | 169 | 153 | 48 | 118 | 168 | 52 | 225 | 140 | 85 |
| Spalling resistance (Lifespan cycles) | 6 | 4 | 6 | 5 | 9 | 5 | 6 | 9 | 4 |
| Slaking resistance | O | O | O | O | O | O | O | O | X |
| Corrosion resistance (mm) | 5.7 | 5.6 | 7.2 | 5.5 | 7.1 | 7.4 | 7.9 | 6.9 | 10.7 |
| Resistance to slag penetration (mm) | 2.7 | 2.8 | 4.9 | 4.0 | 4.5 | 3.9 | 3.6 | 3.8 | 8.7 |
| Acltual use test (mm) | 82 | 75 | — | 70 | — | — | — | — | — |

In the mixture proportions, the ralues within ( ) indicate wt % by further addition.
In the actual use test, "—" indicates that the test was not conducted.

TABLE 4

Embodiments, Comparative Examples, and Test Results Thereof

| | Embodiments of the Invention | | | | | Comparative Examples | |
|---|---|---|---|---|---|---|---|
| | 11 | 12 | 13 | 14 | 15 | 10 | 11 |
| Mixture proportions wt % | | | | | | | |
| Sintered alumina 5–1 mm | | | 50 | 25 | 50 | 50 | |
| Fused alumina 5–1 mm | 50 | 50 | | 25 | | | 50 |
| Fused alumina 1 mm or less | 20 | 20 | 20 | 20 | 20 | 20 | 20 |
| Sintered alumina 0.075 mm or less | 5 | 5 | | 5 | 5 | | 5 |
| Calcined alumina 10 μm or less | 5 | 5 | 5 | | | 5 | 5 |
| Sintered magnesia 5–1 mm | | | 5 | | | | |
| Sintered magnesia 1–0.045 mm | | 2 | 5 | 5 | 5 | 5 | |
| Magnesia superfines A | 5 | 4 | 5 | 5 | | 5 | 5 |
| Magnesia superfines B | 5 | 4 | 5 | 5 | 5 | 5 | 5 |
| Magnesia superfines C | | | | | 5 | | |
| Alumina cement | 10 | 10 | 5 | 10 | 10 | 10 | 10 |
| Amorphous silica superfines | (1.5) | (1.0) | (2.0) | (1.5) | (2.5) | (2.0) | (2.0) |
| supercoarse large spinel particles A | (20) | | (30) | (10) | (10) | | |
| supercoarse large spinel particles B | | (20) | | (10) | | | |
| supercoarse large spinel particles C | | | | | | (20) | |
| supercoarse large spinel particles D | | | | | | | (20) |
| Supercoarse large alumina particles A | | | | | (10) | | |
| Test | | | | | | | |
| Modulus of rupture (kg/cm²) | | | | | | | |
| After-drying | 103 | 96 | 92 | 101 | 108 | 94 | 55 |
| After-heating | 143 | 151 | 152 | 148 | 154 | 145 | 65 |
| Spalling resistance (Lifespan cycles) | 11 | 10 | 11 | 10 | 11 | 6 | 4 |
| Slaking resistance | o | o | o | o | o | o | x |
| Corrosion resistance (mm) | 5.3 | 5.1 | 5.1 | 5.2 | 5.3 | 5.5 | 8.9 |
| Resistance to slag penetration (mm) | 2.6 | 2.3 | 2.5 | 2.6 | 2.8 | 3.6 | 4.2 |
| Acltual use test (mm) | — | 124 | 120 | — | — | — | — |

In the mixture proportions, the ralues within ( ) indicate wt % by further addition.
In the actual use test, "—" indicates that the test was not conducted.

In each example, 5 weight percent of water for casting work and 0.1 weight percent of a dispersant (hexametaphosphate soda) were added by further addition, and after mixing, material was casted while applying vibration to the mold, and after curing, this was dried at a temperature of 110° C. and for a period of 24 hours. The testing methods were as given below.

Spalling resistance: A single-sided heat spall test (1400° C.) was conducted. A cycle of heating for 30 minutes followed by 5 minutes of water cooling was repeated, and the number of cycles until the beginning of spalling was measured. The value shown represents a rounding of the average value of 10 samples.

Modulus of rupture: Measurement was conducted at room temperature after drying at 110° C. and heating to a temperature of 1500° C. The value shown represents a rounding of the average value of 5 samples.

Corrosion resistance: Using an erosion agent having a weight ratio of billets:converter slag (amount of FeO contained: 20 weight percent) of 70:30, a rotational erosion test was conducted at a temperature of 1650° C. and for a period of 5 hours, and the melting loss dimensions were measured.

Resistance to slag penetration: After conducting a rotational erosion test under the above conditions, the slag penetration dimensions were measured.

Slaking resistance: After conducting casting, the samples were allowed to cure for a period of 24 hours, and the presence or absence of cracking was confirmed in the samples after treatment at 130° C. for a period of 6 hours using an autoclave testing apparatus.

Actual use test: The refractory was used as the side wall lining of a 300 ton molten steel ladle, and the wear dimensions thereof were determined after use for 100 charges.

The embodiments of the present invention exhibited satisfactory results in all of the tests for spalling resistance, slaking resistance, corrosion resistance, and resistance to slag penetration. Among these, the embodiments 4–15, into which magnesia superfines having a particle diameter of 15 μm or less were blended, exhibited particularly superior spalling resistance, corrosion resistance, and resistance to slag penetration.

In contrast, Comparative Example 1, in which the proportion of magnesia superfines was large, and Comparative Example 2, in which the total amount of magnesia was large, exhibited poor spalling resistance. Comparative Example 3, in which the particle diameter of the super-coarse large particles was too large, and Comparative Example 6, in which the amount of super-coarse large particles added was large, exhibited a decline in the strength of the construction, and exhibited poor corrosion resistance. Comparative Example 4, which used super-coarse large magnesia particles, exhibited poor spalling resistance, as a result of the large thermal expansion of the super-coarse large particles themselves. Comparative Example 5, to which few super-coarse large particles were added, exhibited poor spalling resistance, corrosion resistance, and resistance to slag penetration, possibly because the spinel formation around the super-coarse large particles was insufficient. Comparative Example 7, in which too much amorphous silica superfines were present, exhibited a tendency of a decrease in corrosion resistance as a result of the generation of silica materials having a low melting point, and a decline in spalling resistance resulting from excessive sintering. Comparative Example 8, to which magnesia superfines were not added, exhibited poor spalling resistance, corrosion resistance, and resistance to slag penetration, possibly because the spinel formation around the super-coarse large particles was insufficient. Furthermore, Comparative Example 9, which did not employ amorphous silica superfines, exhibited poor slaking resistance and corrosion resistance, as a result of the hydration of the magnesia superfines by the water for casting work. Comparative Example 10, which employed super-coarse large spinel particles in which the values of $MgO.Al_2O_3$ were essentially spinel theoretical values, was unable to obtain resistance to spalling, possibly because a spinel formation reaction was not produced between the super-coarse large particles and the magnesia superfines. Comparative Example 11, to which magnesia-rich super-coarse large spinel particles were added in which the ratio of MgO was higher than that in a spinel theoretical composition, experienced a decline in strength as a result of the degradation of the refractory structure as a result of hydration by the magnesia present in the super-coarse large particles, and exhibited poor spalling resistance, corrosion resistance, and resistance to slag penetration.

In the embodiments described above, an actual use test was conducted in the side wall of a ladle; however, the monolithic refractory for use in casting operations in accordance with the present invention is not limited thereto, and is capable of exhibiting superior effects when used as the bottom portion, or the impact portion of a ladle. Furthermore, it is possible to use the refractory of the present invention as a lining for tundish which come into contact with molten steel, converters, electric furnaces, vacuum de-gassing vessel, or the like, or as heat resistant cladding for snorkel for use in vacuum de-gassing vessel, freeboards for use in ladle refining, lances for uses in gas blowing, or the like.

In this way, in the present invention, magnesia superfines and super-coarse large alumina particles are combined at predetermined particle diameters and proportions in an alumina-magnesia casting material, and thereby, it is possible to achieve superior spalling resistance effects which could not be expected with conventional materials. As a result, in addition to the slag erosion resistance and resistance to slag penetration which are possessed by alumina-magnesia materials, as a result of the increase in spalling resistance described above, it has become possible to provide a casting material which is sufficiently capable of use even in the increasingly severe operational conditions of recent years, and the industrial value of this is extremely high.

What is claimed is:

1. A refractory for use in casting operation, comprising:

0.0357–2.6548 wt % of amorphous silica particles having a specific surface area within a range of 15–30 $m^2/g$;

8.8495–28.5612wt % of first alumina particles having a particle diameter within a range of 10–50 mm;

1.3986–18.1715 wt % of at least one of fused magnesia and sintered magnesia, said at least one of fused magnesia and sintered magnesia containing 0.6993–10.9041 wt % of magnesia having a maximum particle diameter under 44 μm;

0.6993–13.630 wt % of alumina cement; and 45.4545–88.1417 wt % of second alumina particles having a particle diameter less than 10 mm so that when the refractory is used, said at least one of fused magnesia and sintered magnesia surrounds said first alumina particles, which react together generate spinel to thereby form micro-crack layer around the first alumina particles for preventing propagation of cracks in a refractory structure.

2. A refractory for use in casting operations in accordance with claim 1, wherein at least a portion of said alumina particles comprise $MgO.Al_2O_3$ spinel containing at least 80 weight percent of $Al_2O_3$.

3. A refractory for use in casting operation, comprising:

0.0357–2.6548 wt % of amorphous silica particles having a specific surface area within a range of 15–30 $m^2/g$;

8.8495–28.5612wt % of first alumina particles having a particle diameter within a range of 10–50 mm;

1.3986–18.1715 wt % of at least one of fused magnesia and sintered magnesia, said at least one of fused magnesia and sintered magnesia containing 0.6993–9.0867 wt % of magnesia having a maximum particle diameter under 15 μm;

0.6993–13.630 wt % of alumina cement; and 45.4545–88.1417 wt % of second alumina particles having a particle diameter less than 10 mm so that when the refractory is used, said at one of fused magnesia and sintered magnesia surrounds said first alumina particles, which react together to generate spinel to thereby form micro-crack layer around the first alumina particles for preventing propagation of cracks in a refractory structure.

4. A refractory for use in casting operations in accordance with claim 3, wherein at least a portion of said alumina particles comprise $MgO \cdot Al_2O_3$ spinel containing at least 80 weight percent of $Al_2O_3$.

* * * * *